(12) United States Patent
Ma (10) Patent No.: US 12,384,196 B2
(45) Date of Patent: Aug. 12, 2025

(54) COLLAPSIBLE ARTISTIC SCULPTURE AND METHOD OF MAKING THE SAME

(71) Applicant: Wen Jennifer Ma, New York, NY (US)

(72) Inventor: Wen Jennifer Ma, New York, NY (US)

( * ) Notice: Subject to any disclaimer, the term of this patent is extended or adjusted under 35 U.S.C. 154(b) by 0 days.

(21) Appl. No.: 18/636,225

(22) Filed: Apr. 15, 2024

(65) Prior Publication Data
US 2024/0286431 A1 Aug. 29, 2024

Related U.S. Application Data

(63) Continuation-in-part of application No. 16/942,910, filed on Jul. 30, 2020, now abandoned.

(51) Int. Cl.
| | |
|---|---|
| *B44C 3/12* | (2006.01) |
| *B32B 7/08* | (2019.01) |
| *B32B 7/12* | (2006.01) |
| *B32B 37/12* | (2006.01) |
| *B32B 37/18* | (2006.01) |
| *B32B 38/00* | (2006.01) |
| *B44C 3/02* | (2006.01) |
| *B44C 5/00* | (2006.01) |

(52) U.S. Cl.
CPC .................. *B44C 3/12* (2013.01); *B32B 7/08* (2013.01); *B32B 7/12* (2013.01); *B32B 37/1292* (2013.01); *B32B 37/182* (2013.01); *B32B 38/0004* (2013.01); *B44C 3/02* (2013.01); *B44C 5/00* (2013.01); *B32B 2451/00* (2013.01)

(58) Field of Classification Search
CPC ............ B32B 2451/00; B32B 7/08–09; B32B 7/12–7/14; B32B 27/10; B32B 29/002; B32B 37/1292; B32B 37/182; B32B 38/0004; B44C 3/02–025; B44C 5/00
See application file for complete search history.

(56) References Cited

U.S. PATENT DOCUMENTS

| | | | | |
|---|---|---|---|---|
| 2,346,824 | A * | 4/1944 | Cohen ...................... | A01G 5/04 |
| | | | | 428/116 |
| 2,668,385 | A * | 2/1954 | Pettorossi .............. | A47G 33/08 |
| | | | | 493/379 |
| 2,974,434 | A * | 3/1961 | Gibson .................. | B42D 15/04 |
| | | | | 428/116 |
| 3,170,831 | A * | 2/1965 | Paige ..................... | A47G 33/08 |
| | | | | 428/9 |

(Continued)

*Primary Examiner* — Matthew P Travers
(74) *Attorney, Agent, or Firm* — Kevin Keener; Keener and Associates P.C.

(57) ABSTRACT

Disclosed is a method of making an extensible sculpture including providing a plurality of flexible material sheets; cutting each of the plurality of flexible material sheets to form a plurality of at least three sculptural pieces; arranging the sculptural pieces in a predetermined order; defining a first set of connection columns on the top face of the first sculptural piece; using a first connector to fixedly connect the bottom face of the second sculptural piece to the top face of the first sculptural piece at the first set of connection columns; defining a second set of connection columns on the top face of the second sculptural piece; and using a second connector to fixedly connect the bottom face of the third sculptural piece to the top face of the second sculptural piece at the second set of connection columns.

16 Claims, 9 Drawing Sheets

(56) References Cited

U.S. PATENT DOCUMENTS

2013/0265758 A1* 10/2013 Smith .................. B44C 5/00
29/428
2015/0047524 A1* 2/2015 Todie .................. B42D 1/006
101/483

* cited by examiner

COLLAPSIBLE ARTISTIC SCULPTURE AND METHOD OF MAKING THE SAME

PRIORITY

This application claims priority to, and is a continuation-in-part of, U.S. patent application Ser. No. 16/942,910, filed on Jul. 30, 2020, the disclosure of which is hereby fully incorporated by reference.

FIELD OF THE INVENTION

The present disclosure is generally related to an artistic sculpture and a method for making an artistic sculpture, more particularly, this disclosure is related to apparatuses and methods of making an extensible sculpture from a plurality of flexible material sheets.

BACKGROUND OF INVENTION

Extensible sculptures have a variety of uses including, but not limited to aesthetic sculptures such as artistic sculptures.

It remains desirable to develop extensible sculptures that are cheaper to manufacture, simpler to manufacture, quicker to manufacture, less prone to important quality problems during manufacture, or some combination thereof.

Accordingly, those skilled in the art continue with research and development efforts directed to extensible sculptures.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

Disclosed is a method of making an extensible sculpture. In one aspect the method comprises providing a plurality of flexible material sheets; cutting each of the plurality of flexible material sheets to form a plurality of at least three sculptural pieces wherein each of the sculptural pieces has a top face and a bottom face opposite the top face; arranging the sculptural pieces in a predetermined order to define at least a first sculptural piece, a second sculptural piece, and a third sculptural piece; defining a first set of connection columns on the top face of the first sculptural piece, each of the connection columns of the first set of connection columns being elongated and each being offset from one another; using a first connector to fixedly connect the bottom face of the second sculptural piece to the top face of the first sculptural piece at the first set of connection columns; defining a second set of connection columns on the top face of the second sculptural piece, each of the connection columns of the second set of connection columns being elongated and each being offset from one another and each being offset from each of the connection columns of the first set of connection columns; and using a second connector to fixedly connect the bottom face of the third sculptural piece to the top face of the second sculptural piece at the second set of connection columns.

Also disclosed is an extensible sculpture. In one aspect, the extensible sculpture comprises a plurality of a number N of sculptural pieces where the number N is at least 4; where each of the sculptural pieces has a top face and a bottom face opposite the top face; where the plurality of sculptural pieces are arranged in a predetermined order from a first sculptural piece, to a second sculptural piece, to at least one intermediate sculptural piece, to a last sculptural piece; wherein the top face of the first sculptural piece comprises a first set of connection columns with each of the connection columns of the first set of connection columns being elongated and each being offset from one another. In this latter aspect the extensible sculpture further comprises a first connector fixedly connecting the bottom face of the second sculptural piece to the top face of the first sculptural piece at the first set of connection columns; wherein the top face of the second sculptural piece comprises a second set of connection columns with each of the connection columns of the second set of connection columns being elongated, being offset from one another, and being offset from each of the connection columns of the first set of connection columns; and a second connector fixedly connecting the bottom face of the at least one intermediate sculptural piece to the top face of the second sculptural piece at the second set of connection columns.

Also disclosed is a method of making an extensible sculpture. In certain aspects the method includes providing a plurality M of flexible material sheets; cutting each of the plurality of flexible material sheets to form a plurality N of sculptural pieces where N is greater than M and where N is at least 3, wherein each of the sculptural pieces has a top face and a bottom face opposite the top face; arranging the sculptural pieces in a predetermined order to define at least a first sculptural piece, a second sculptural piece, and a third sculptural piece; defining a first set of connection columns on the top face of the first sculptural piece, each of the connection columns of the first set of connection columns being elongated, each being offset from one another, and each being within 5 degrees of parallel to each other; using an adhesive to fixedly connect the bottom face of the second sculptural piece to the top face of the first sculptural piece at the first set of connection columns; defining a second set of connection columns on the top face of the second sculptural piece, each of the connection columns of the second set of connection columns being elongated, each being offset from one another, each being offset from each of the connection columns of the first set of connection columns, and each being within 5 degrees of parallel to each other; and using the adhesive to fixedly connect the bottom face of the third sculptural piece to the top face of the second sculptural piece at the second set of connection columns.

Still other embodiments of the present invention will become readily apparent to those skilled in this art from the following description wherein there is shown and described the embodiments of this invention, simply by way of illustration of the best modes suited to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

Various exemplary embodiments of this invention will be described in detail, wherein like reference numerals refer to identical or similar components, with reference to the following figures, wherein.

DETAILED DESCRIPTION OF THE PREFERRED EMBODIMENT

The claimed subject matter is now described with reference to the drawings. In the following description, for purposes of explanation, numerous specific details are set forth in order to provide a thorough understanding of the claimed subject matter. It may be evident, however, that the claimed subject matter may be practiced with or without any combination of these specific details, without departing from the spirit and scope of this invention and the claims.

Referring to FIGS. 1, 2 and 9-11, in some aspects the disclosed extensible sculpture 100 includes a sculptural piece 120 that may be cut from a flexible material sheet 110. In some aspects a flexible material sheet 110 comprises paper, cloth, a polymer sheet, metal foil, or some combination thereof. In the aspect shown in FIG. 1, a single flexible material sheet 110 may be cut to form more than one sculptural piece 120. This latter example is not limiting and it is also contemplated that a flexible material sheet 110 may be cut to form a single sculptural piece 120 or more than two sculptural pieces 120. Generally, a single flexible material sheet 110 may be cut to form 1 sculptural piece 120, or 2 sculptural pieces, or 3 sculptural pieces, or some plural number N sculptural pieces, where N is an integer greater than 1. In some aspects, N will be greater than 4. In some aspects, N will be 10 or greater.

In general, a plural number M of flexible material sheets 110 may be provided and these same M flexible material sheets 110 may be cut to form a plural number N of sculptural pieces 120 where N is at least 3 and where N is equal to or greater than M.

The operation to cut a sculptural piece 120 from a flexible material sheet 110 may be performed with a knife, a razor, scissors, or other blade. In some aspects, the operation to cut a sculptural piece 120 from a flexible material sheet 110 may be performed by die cutting or laser cutting. The cutting may be a manual process, an automated process, or a combination thereof.

Figure 1:
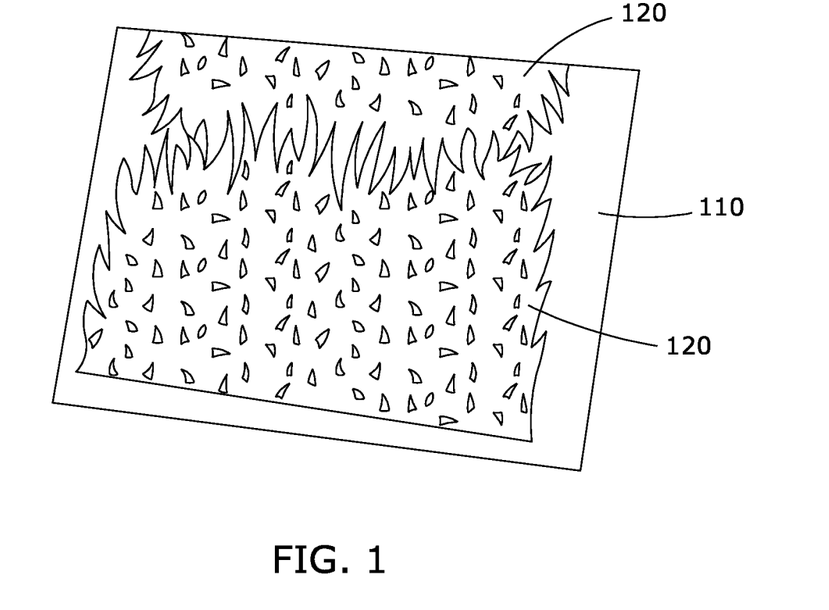
FIG. 1 is a view of a first aspect of a flexible material sheet.
Figure 2:
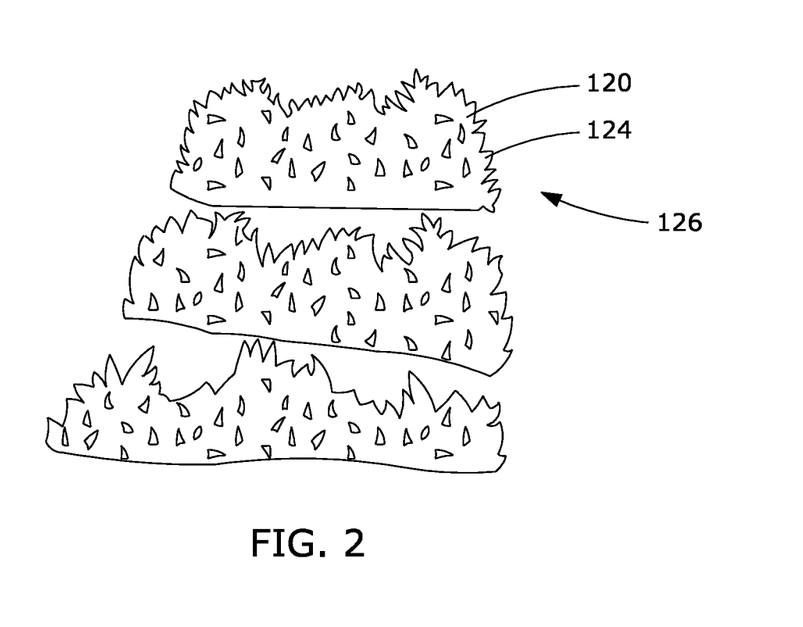
FIG. 2 is a view of a first aspect of a first sculptural piece, a second sculptural piece, and a third sculptural piece.
Figure 8:
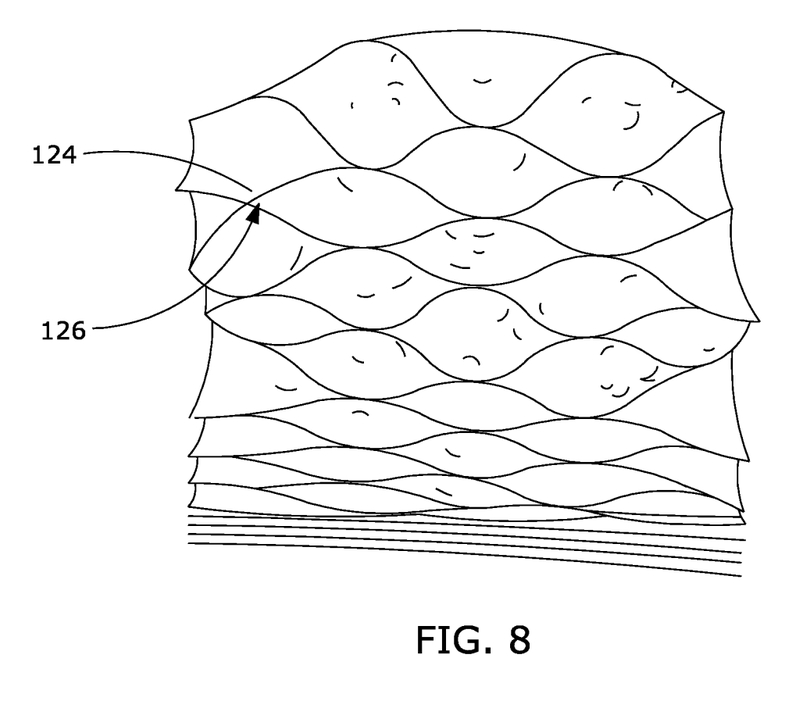
FIG. 8 is a bottom view of the first aspect of an extensible sculpture in an opened configuration.
Figure 9:
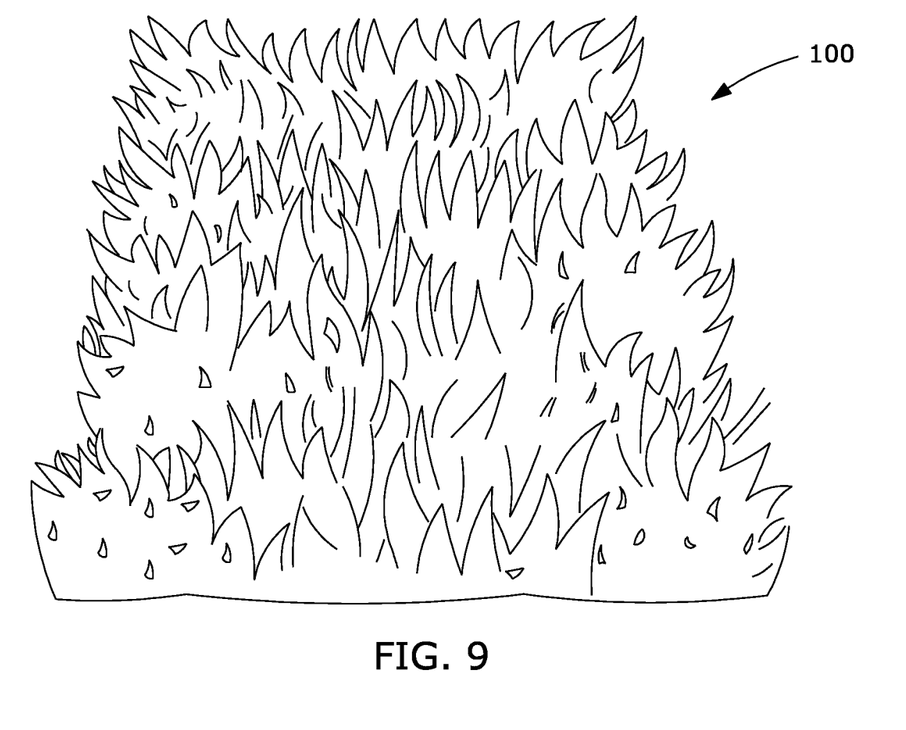
FIG. 9 is a first top view of the first aspect of an extensible sculpture in an opened configuration.
Figure 10:
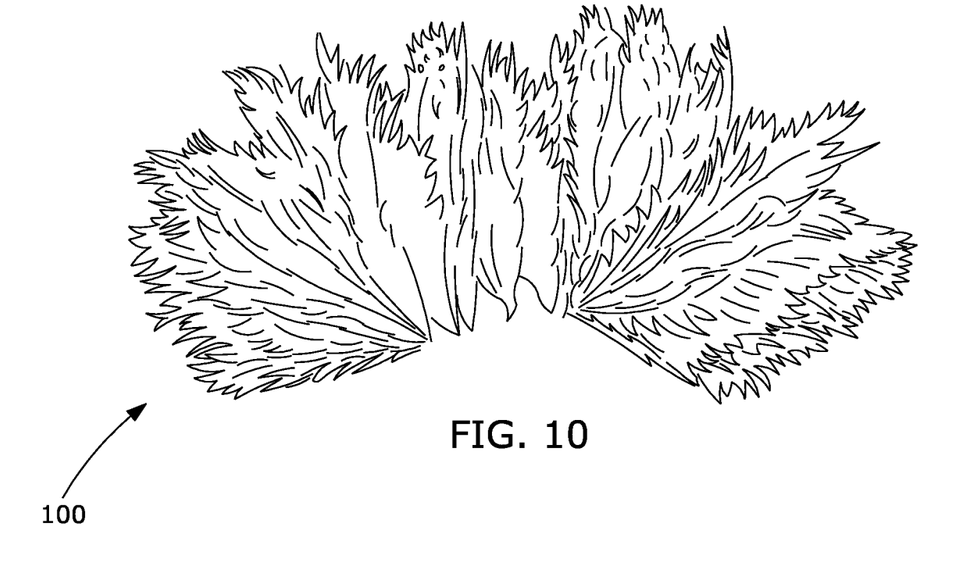
FIG. 10 is another top view of the first aspect of an extensible sculpture in another opened configuration.
Figure 11:
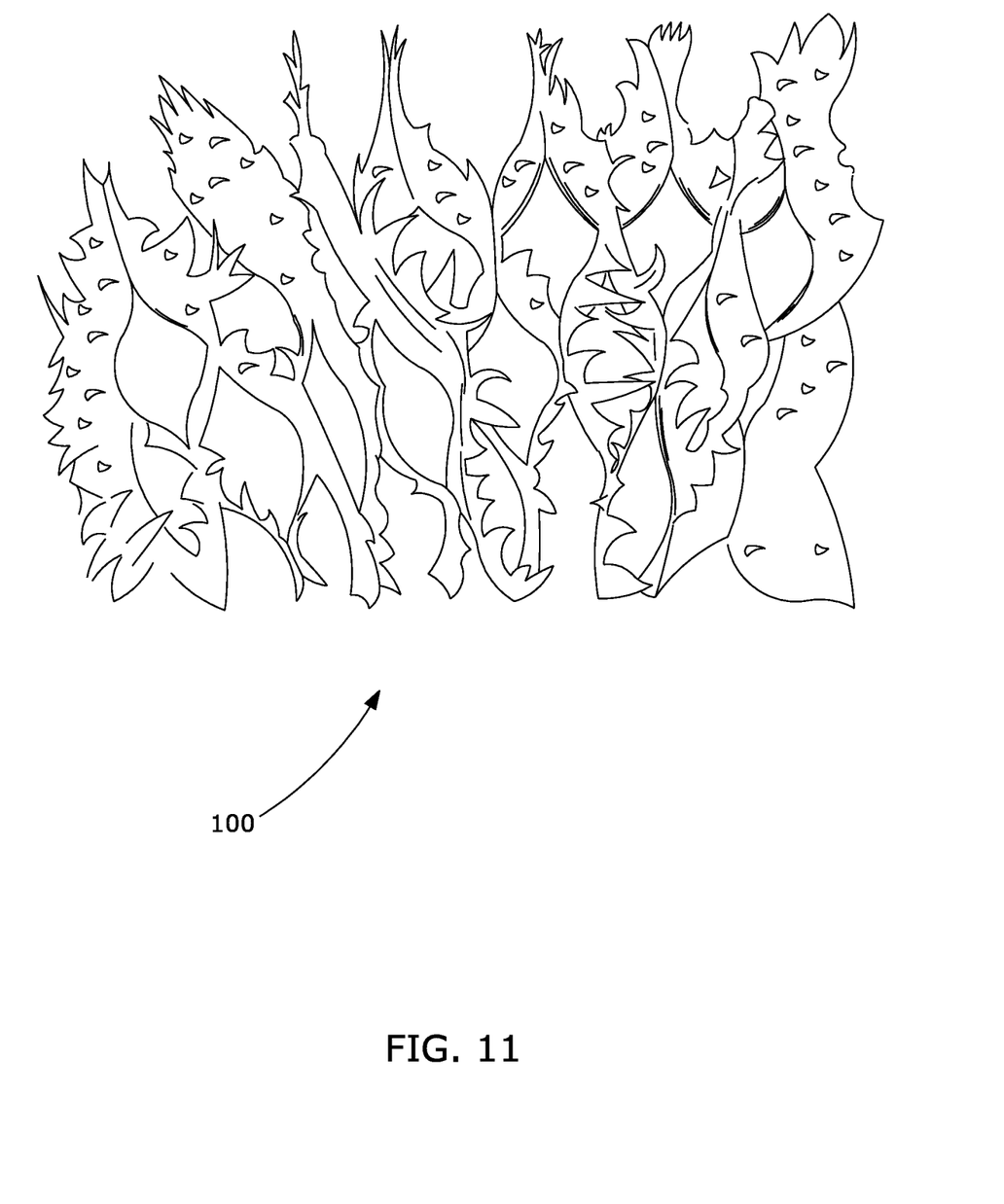
FIG. 11 is another top view of the first aspect of an extensible sculpture in another opened configuration.

Referring now to FIGS. 2 and 8, in some aspects each sculptural piece 120 has a top face 124 and a bottom face 126 opposite the top face 124. A sculptural piece 120 will have some thickness separating the top face 124 from the bottom face 126, but in some aspects this thickness may be very small. In some non-limiting aspects, the thickness of a sculptural piece 120 is less than 5 mm, less than 1 mm, or less than 0.5 mm, or less than 0.2 mm.

Referring to FIGS. 2-6, in some aspects the disclosed extensible sculpture 100 is assembled from a plurality of N number of sculptural pieces 120. In this latter aspect, the sculptural pieces 120 are arranged in a predetermined order from a first sculptural piece 131, to a second sculptural piece 141, to one or more optional intermediate sculptural pieces 151, to a last sculptural piece 171. In this latter aspect, the second sculptural piece 141 is an intermediate sculptural piece 151. In this latter aspect, there is a third sculptural piece 161 that is also an intermediate sculptural piece 151. In this latter aspect, the top face 132 of the first sculptural piece 131 comprises a first set 134 of connection columns 135, 136, 137 with each of the connection columns 135, 136, 137 of the first set 134 of connection columns being elongated and each being offset from one another.

The connection columns of the first set 134 of connection columns, or any other set of connection columns, may be substantially parallel to one another. As used herein "substantially parallel" to one another means that the columns are within 10 degrees of parallel to each other. Columns that are "substantially parallel" to one another may also be within 5 degrees of parallel to each other, or within 1 degree of parallel to one another.

With continued reference to FIGS. 2-6, in this latter aspect these connection columns 135, 136, 137 each comprise a connector. Here, and in general throughout this disclosure unless otherwise noted, a connector may be an adhesive, or an adhesive strip or tape, or stitching, or mechanical fastener, such as, but without limitation, a grommet. The connector on the first sculptural piece 131 may be referred to herein as the first connector 138. In the aspect shown, the first connector 138 is an adhesive strip.

With continued reference to FIGS. 3-6, in the latter aspect the first connector 138 is used to fixedly connect the bottom face 143 of the second sculptural piece 141 to the top face 132 of the first sculptural piece 131 at the first set 134 of connection columns 135, 136, 137.

With continued reference to FIGS. 3-6, in the latter aspect the second sculptural piece 141 is assembled and used in a fashion similar to that of the first sculptural piece 131. The top face 142 of the second sculptural piece 141 comprises a second set 144 of connection columns 145, 146. Each of the connection columns 145, 146 of the second set 144 of connection columns 145, 146 is elongated and is offset from one another. As assembled in the latter aspect of the extensible sculpture 100, each of the connection columns 145, 146 of the second set 144 of connection columns 145, 146 is offset from each of the connection columns 135, 136, 137 of the first set 134 of connection columns 135, 136, 137. In this latter aspect, the second set 144 of connection columns 145, 146 comprises a second connector 148. In the aspect shown, the second connector 148 is an adhesive strip. In other aspects the second connector 148 may be an adhesive, or stitching, or mechanical fastener.

It should be understood that the current subject matter covers both aspects where the connector on any given sculptural piece is the same as that on another sculptural piece, as well as aspects where the connector on any given sculptural piece differs from that on another sculptural piece. In the non-limiting aspect shown in FIGS. 3-5, the first connector 138 is the same as the second connector 148. In other aspects, the first connector 138 differs from the second connector 148. Similarly, the first connector 138 may be the same as the connector on any other sculptural piece 120.

Figure 4:
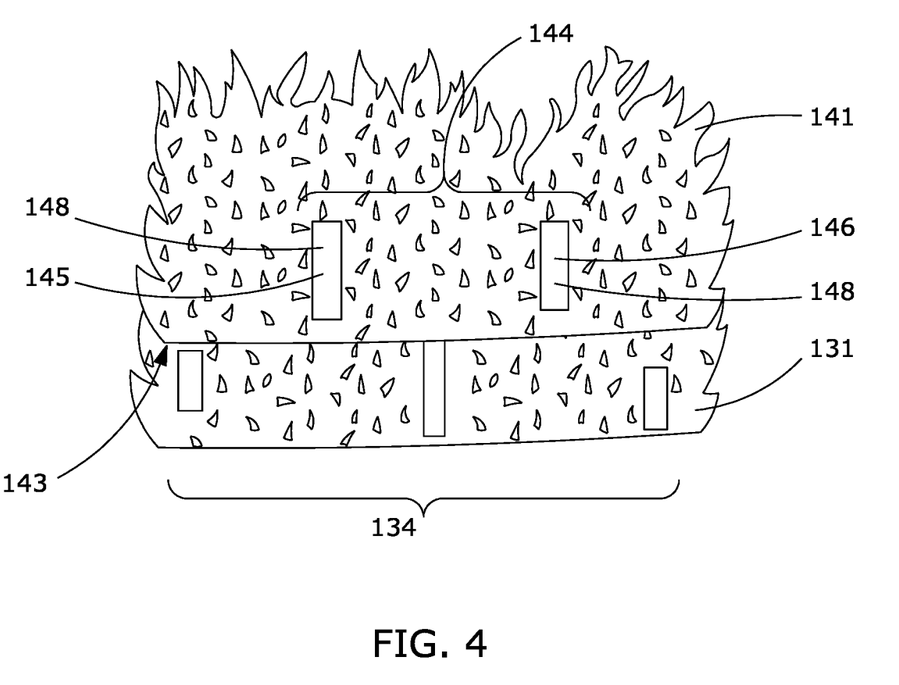
FIG. 4 is a close up view of the second aspect of a first sculptural piece with a second aspect of a second sculptural piece overlaid thereon.
Figure 5:
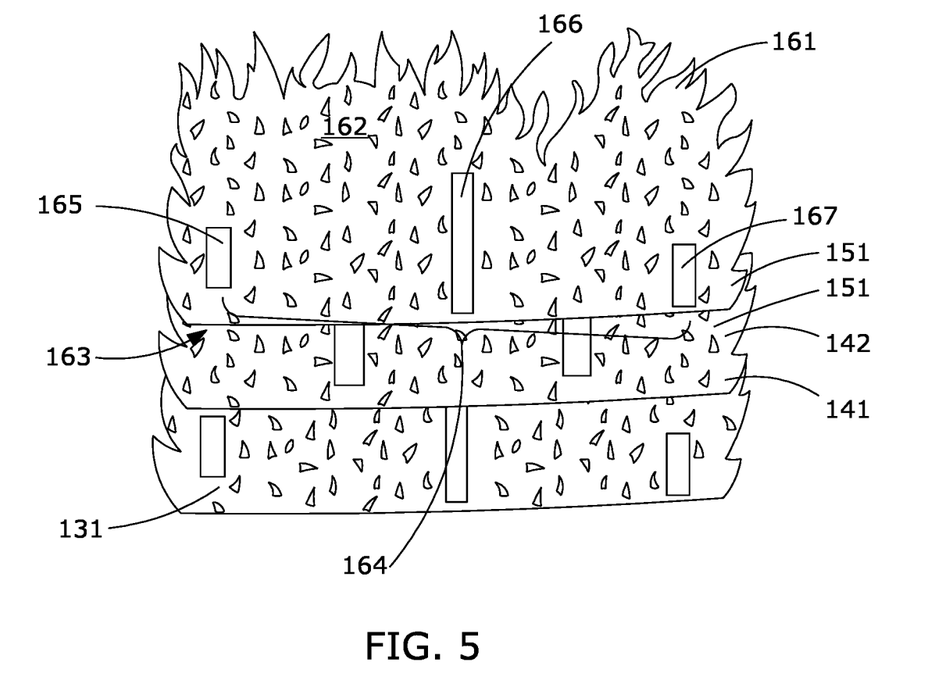
FIG. 5 is a close up view of a first sculptural piece with a second aspect of a second sculptural piece overlaid thereon and a third sculptural piece overlaid over the second sculptural piece.
Figure 6:
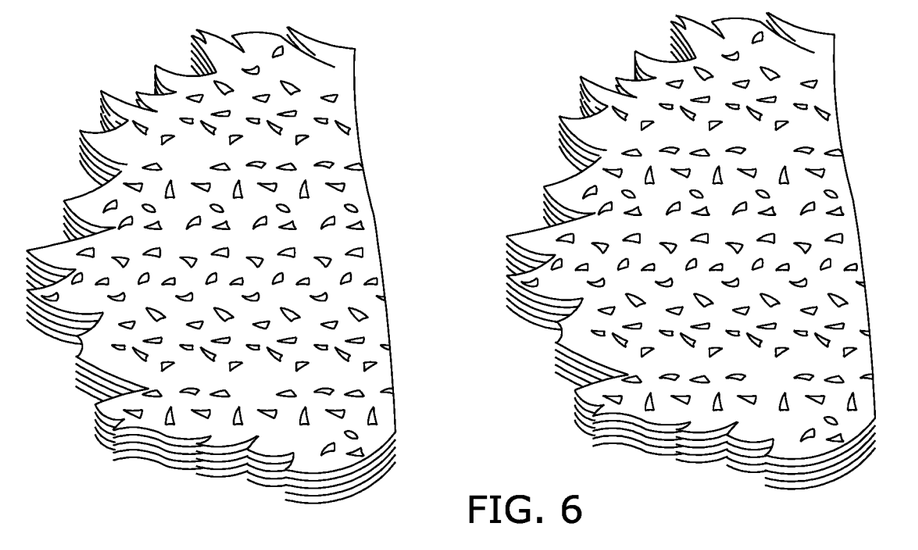
FIG. 6 is a view of a plurality of sculptural pieces being stacked in a predetermined order.
Figure 7:
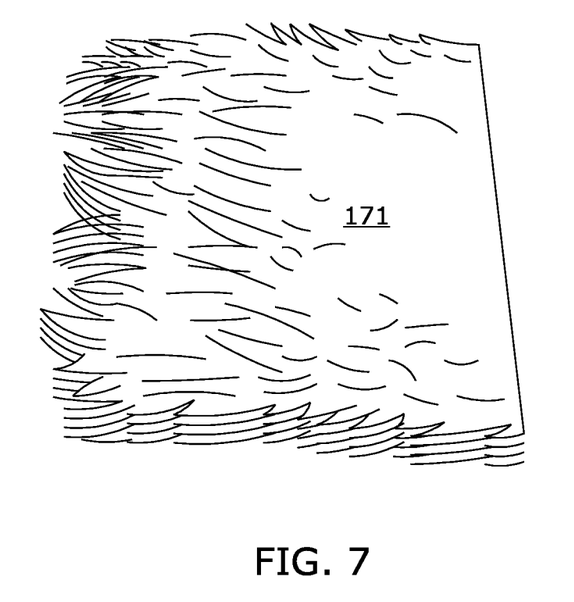
FIG. 7 is a view of a plurality of sculptural pieces stacked in a predetermined order to form a first aspect of an extensible sculpture in a closed configuration.

With continued reference to FIGS. 4-6, in the latter aspect the second connector 148 is used to fixedly connect the bottom face 163 of the third sculptural piece 161 to the top face 142 of the second sculptural piece 141 at the second set 144 of connection columns 145, 146.

With continued reference to FIGS. 3-6, in the latter aspect the third sculptural piece 161 is assembled and used in a fashion similar to that of the first sculptural piece 131 and the second sculptural piece 141. The top face 162 of the third sculptural piece 161 comprises a third set 164 of connection columns 165, 166, 167. Each of the connection columns 165, 166, 167 of the third set 164 of connection columns 165, 166, 167 is elongated and is offset from one another. As assembled in the latter aspect of the extensible sculpture 100, each of the connection columns 165, 166, 167 of the third set 164 of connection columns 165, 166, 167 is offset from each of the connection columns 145, 146 of the second set 144 of connection columns 145, 146. As assembled in the latter aspect of the extensible sculpture 100, each of the connection columns 165, 166, 167 of the third set 164 of connection columns 165, 166, 167 is aligned with a corresponding connection column 135, 136, 137 of the first set 134 of connection columns 135, 136, 137, although this is merely exemplary of one optional aspect and is not limiting.

In some aspects, assembly of the extensible sculpture 100 continues in the fashion described above until each of the desired sculptural pieces 120 after the first sculptural piece 131 has been fixedly connected to the prior sculptural pieces 120.

In a sculpture consisting of an arbitrary number N of sculptural pieces 120, where N is 3 or greater, each of the sculptural pieces 120 may be referred to by a number from 1 to N, such that there is the first (1st) sculptural piece 131 and the last (Nth) sculptural piece 171 an at least one intermediate (N−1 th) sculptural piece 151. In aspects with a plurality of intermediate sculptural pieces 151, there are N−2 intermediate pieces 151 which may be numbered from 2 to N−1. Each intermediate sculptural piece 151 is fixedly connected to exactly two other sculptural pieces 120 with the 2nd piece fixedly connected to the 1st and 3rd sculptural pieces 120; and generally for each intermediate sculptural piece 151 the N−1 th sculptural piece 151 is fixedly connected to the N−2th and Nth sculptural pieces 120.

Figure 3:
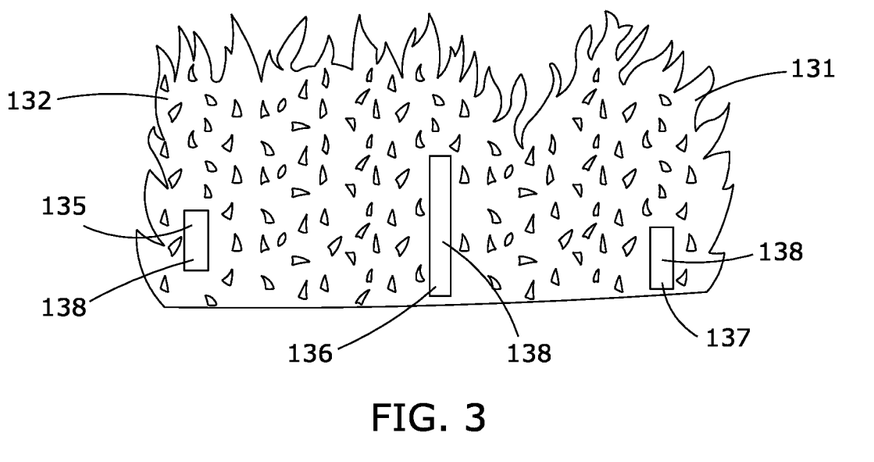
FIG. 3 is a close up view of a second aspect of a first sculptural piece with a first set of connection columns.

Referring now to FIGS. 1-6, it can be seen that in some aspects one or more of the sculptural pieces 120 differ from one or more other sculptural pieces 120 in shape, thickness, material, or some combination thereof. In the non limiting aspect shown, the first sculptural piece 131 differs from the second sculptural piece 141. With particular reference to FIGS. 3 and 4, it should be understood that the shape of the first sculptural piece 131 differs from the shape of the second sculptural piece 141. It should also be understood that this latter difference is non-limiting and that there are also acceptable aspects where the first sculptural piece 131 is substantially the same in shape, thickness, material, etc. as the second sculptural piece 141. Similarly, in the non limiting aspect shown, the first sculptural piece 131 differs from the third sculptural piece 161. With particular reference to FIGS. 3 and 5, it should be understood that the shape of the first sculptural piece 131 differs from the shape of the third sculptural piece 161. Again, it should also be understood that this latter difference is non-limiting and that there are also acceptable aspects where any given sculptural piece 120 is substantially the same in shape, thickness, material, etc. as one or more other sculptural pieces 120.

Figure 12:
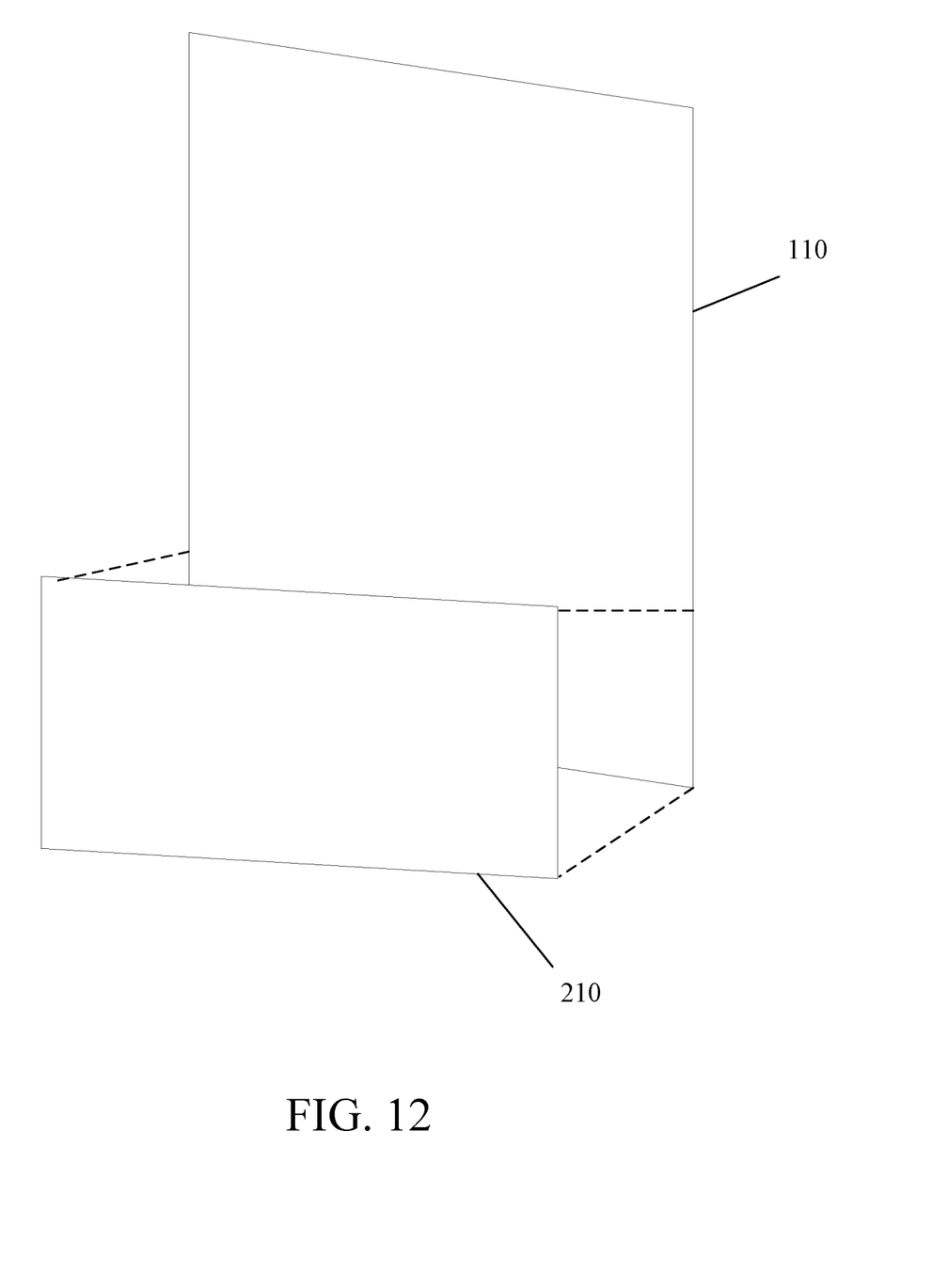
FIG. 12 is a plan view of an alternative embodiment of a flexible material sheet.
Figure 13:
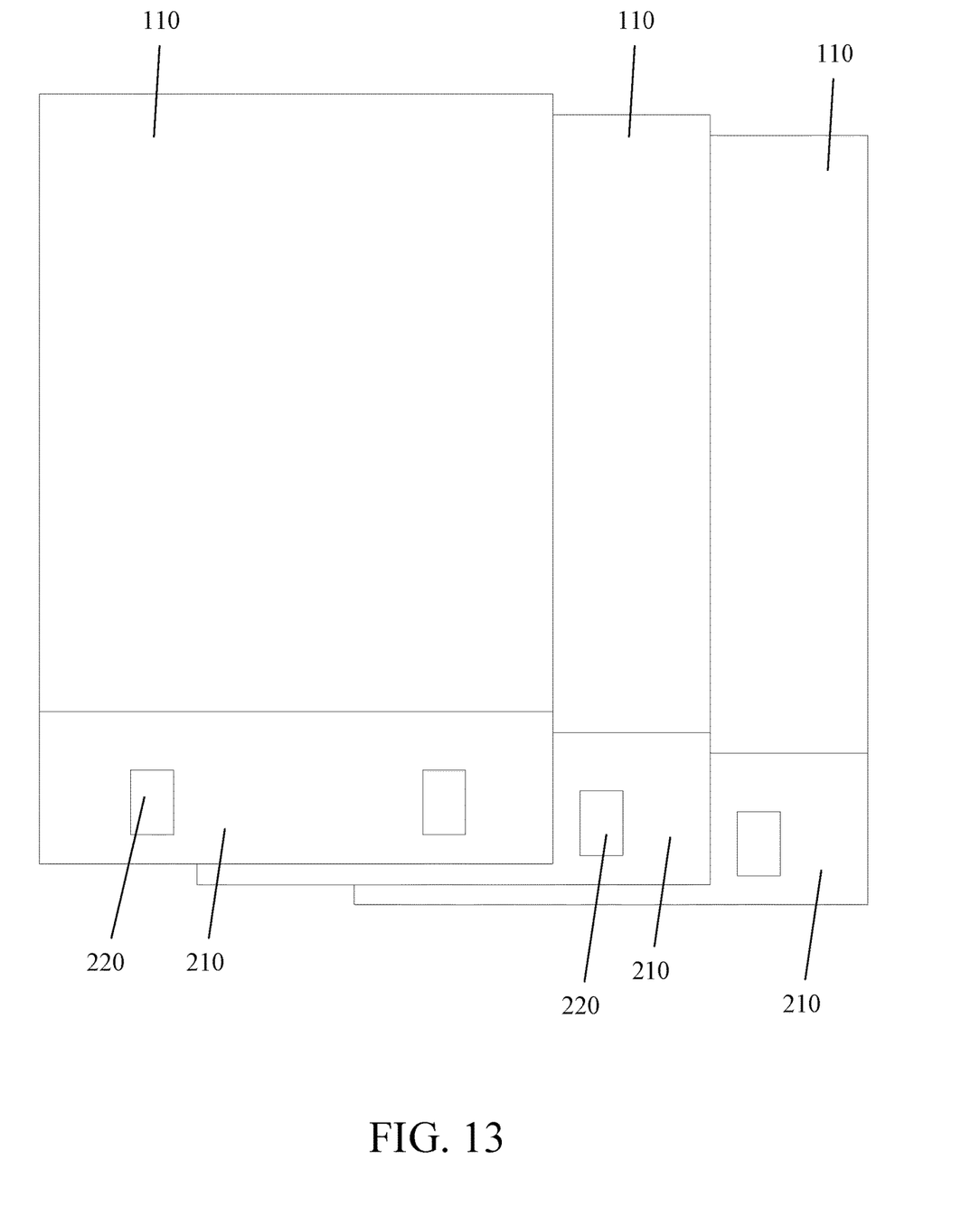
FIG. 13 is a plan view of a plurality of an alternative embodiment of flexible material sheets.
Figure 14:
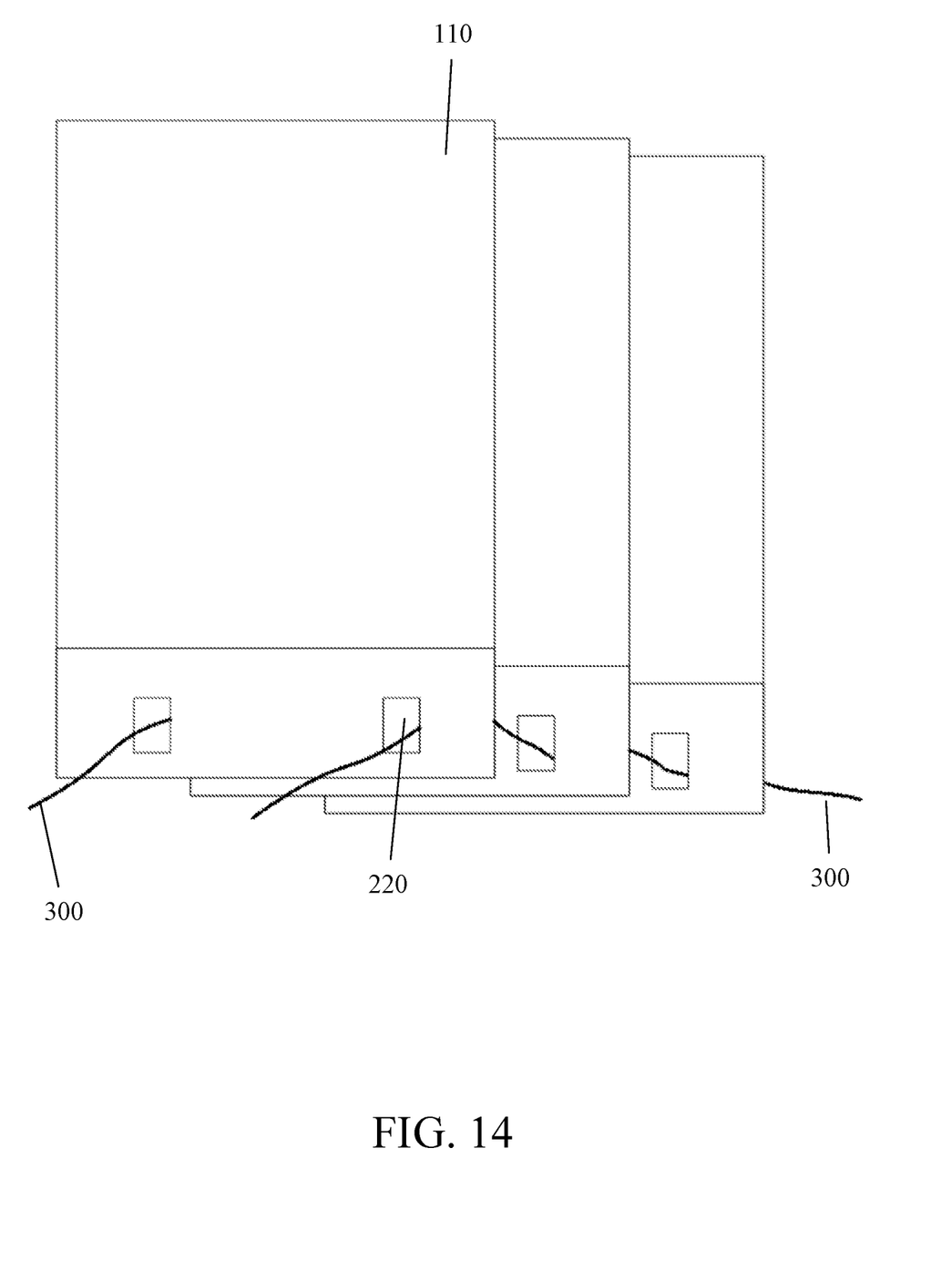
FIG. 14 is a plan view of a plurality of an alternative embodiment of flexible material sheets.

Referring to FIGS. 12-14, an alternative embodiment of the flexible material sheet 110 is illustrated. In this embodiment the flexible material sheet 110 is reinforced with a reinforcing sheet 210. The reinforcing sheet 210 may be any size and shape. The reinforcing sheet 210 may be made from any material. The reinforcing sheet 210 is attached to the flexible material sheet 110 by any number of methods, such as stitching, pinning, grommets, or adhesive.

Once the reinforcing sheet 210 is attached to the flexible material sheet 110, then one or more apertures 220 are placed in the bottom of the sheets. The apertures 220 may be any size and shape. The apertures 220 are utilized to permit one or more cables 300 to be attached to the sheets. The cables 300 may be attached to one or more sheets when passing through a plurality of sheets. In other embodiments the cables are not attached to the sheets. The cables 300 may then be anchored to any substrate or surface, such as a wall, floor, or ceiling. In this manner the sculptural piece may be arranged vertically or placed in other positions than on the floor. The cables 300 may be made of any material. In the preferred embodiment, the cables 300 are made of a wound metal strands, such as aircraft cable.

The reinforcing sheet 210 may be made of any material. Preferably, the reinforcing sheet 210 is sturdier and a more resilient material than the flexible material sheet 110. In the preferred embodiment, the reinforcing sheet 210 is a high-density polyethylene, such as Tyvek®. The reinforcing sheet 210 is also preferably formed by spunbound fibers, permitting the reinforcing sheet 210 to be lightweight, durable, and breathable while also being resistant to water. In other embodiments the reinforcing sheet 210 is an extruded film or woven material.

The reinforcing sheet 210 may have any type of specifications. The reinforcing sheet 210 preferably has the properties in the following table:

| Property | Range | Preferred Value | Test Method |
| --- | --- | --- | --- |
| Unit Weight | 102-109 g/m2 | 105 g/m2 | DIN EN ISO 536 |
| Delamination | 1.2-2.2 N/in | 1.7 N/in | ASTM D 2724-87 |
| Thickness | 190-350 µm | 275 µm | DIN EN 20534 |
| Tensile Strength (Machine Direction) | 260-320 N/in | 290 N/in | DIN EN ISO 1924-2 |
| Tensile Strength (Cross Direction) | 290-370 N/in | 330 N/in | DIN EN ISO 1924-2 |
| Mullenburst | 1450-1950 kPa | 1700 kPa | ISO 2758 |

The reinforcing sheet 210 may extend along the entire surface of the flexible material sheet 110. Alternatively, in the preferred embodiment, the reinforcing sheet 210 extends only along a short section of the flexible material sheet 110. The reinforcing sheet 210 is beneficial because it assists with strengthening the base of the flexible material sheet 110 so that the end sculpture can be made larger.

In some embodiments the distance between the respective connection columns 135, 136, 137 varies depending on the height of the end sculpture. When the flexible material sheet 110 is made only of paper, the resulting sculpture is limited in how tall it can be made because the paper will fall over when stood on end. Variation in the distance between the connection columns 135, 136, 137 and connectors can assist with ensuring that the resulting sculpture can be made taller. When the connection columns 135, 136, 137 are spaced further apart, and the individual flexible material sheets 110 are separated, the flexible material sheets 110 create a larger honeycomb column structure. The further apart the connection columns 135, 136, 137 are located from each other, the larger the resulting columns of the honeycomb. The larger columns creates a greater stability in the resulting sculpture structure, permitting the total height of the sculpture structure to be increased.

For instance, there may be a small sculpture with a height between 20 to 50 cm and a width of 150 cm. In this version there may be eleven total connection columns spaced approximately 12.5 cm apart from each other. In a larger version, the sculpture may have a height between 50 to 100 cm and a width of 150 cm. In this version there may be only nine connection columns spaced approximately 17 cm apart. As can be appreciated, as the height or width of the end sculpture increases, the spacing of the connection columns can be increased to ensure the end stability of the resulting sculpture. The variations in the spacing between connection columns 135, 136, 137 can be all in a single sculpture and constant spacing between all connection columns in a sculpture is not required.

The installation of the resulting sculpture can be done in any manner. In the preferred embodiment the cables 300 are strung across an open space and are anchored to the walls, floors, or ceiling, using the preferred cable anchoring system. Next a fabric is draped over the cables 300 and secured to the surface using staples or other means. Then the cables 300 are threaded through the apertures 220 in each flexible material sheet 110. The flexible material sheets 110 are then separated and the sculpture is opened and stretched across the cables.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example and without limitation, two of item A, one of item B, and ten of item C; four of item B and seven of item C; or some other suitable combination.

As used herein, the terms "approximately" and "about" represent an amount close to the stated amount that still performs the desired function or achieves the desired result. For example, the terms "approximately" and "about" may refer to an amount that is within less than 10% of, within less than 5% of, within less than 1% of, within less than 0.1% of, and within less than 0.01% of the stated amount.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of making an extensible sculpture comprising:
    providing a plurality of flexible material sheets;
    providing a plurality of reinforcing sheets comprising high-density polyethylene;
    adhering a respective one of the plurality of reinforcing sheets to a portion of one of each of said plurality of flexible material sheets;
    cutting each of the plurality of flexible material sheets to form a plurality of at least three sculptural pieces wherein each of the sculptural pieces has a top face and a bottom face opposite the top face;
    cutting a top edge of a first sculptural piece to define a first sculptural piece profile shape;
    cutting a top edge of a second sculptural piece to define a second sculptural piece profile shape;
    cutting a top edge of a third sculptural piece to define a third sculptural piece profile shape;
    wherein the first sculptural piece profile shape is different from the second sculptural piece profile shape and the third sculptural piece profile shape;
    wherein the second sculptural piece profile shape is different from the third sculptural piece profile shape;
    arranging the first sculptural piece, the second sculptural piece, and the third sculptural piece in a predetermined order;
    defining a first set of connection columns on the top face of the first sculptural piece, each of the connection columns of the first set of connection columns being elongated and each being offset from one another;
    using a first connector to fixedly connect the bottom face of the second sculptural piece to the top face of the first sculptural piece at the first set of connection columns;
    defining a second set of connection columns on the top face of the second sculptural piece, each of the connection columns of the second set of connection columns being elongated and each being offset from one another and each being offset from each of the connection columns of the first set of connection columns; and using a second connector to fixedly connect the bottom face of the third sculptural piece to the top face of the second sculptural piece at the second set of connection columns.

2. The method of claim 1 wherein the first connector comprises an adhesive or an adhesive strip or tape, or stitching, or mechanical fastener.

3. The method of claim 1 wherein the second connector comprises an adhesive or an adhesive strip or tape, or stitching, or mechanical fastener.

4. The method of claim 1 wherein the first connector is the same as the second connector.

5. The method of claim 1 wherein each of the connection columns of the first set of connection columns is within 5 degrees of parallel to each other.

6. The method of claim 1 wherein each of the connection columns of the second set of connection columns is within 5 degrees of parallel to each other.

7. The method of claim 6 wherein each of the connection columns of the second set of connection columns is within 5 degrees of parallel to each of the connection columns of the first set of connection columns.

8. The method of claim 1 wherein the plurality of at least three sculptural pieces comprises at least ten sculptural pieces.

9. The method of claim 1 wherein the cutting each of the plurality of flexible material sheets to form a plurality of sculptural pieces is performed using a computer program to draw out a design for each of the plurality of sculptural pieces.

10. The method of claim 1 further comprising cutting multiple sculptural pieces from a single flexible material sheet.

11. The method as in claim 1 further comprising
cutting one or more apertures in each of said flexible material sheets;
providing one or more sections of cable;
respectively threading each of said one or more sections of cable through said one or more apertures.

12. The method as in claim 11 further comprising securing a first portion of said one or more sections of cable to one or more of the plurality of flexible material sheets.

13. The method as in claim 12 further comprising securing a second portion of said one or more sections of cable to a surface.

14. The method as in claim 13 wherein said surface is a ceiling.

15. The method as in claim 1 further comprising
defining a first distance between said first set of connection columns;
defining a second distance between said second set of connection columns;
wherein said first distance is not equal to said second distance.

16. A method of making an extensible sculpture comprising:
providing a plurality M of flexible material sheets;
providing a plurality M of reinforcement sheets;
adhering each reinforcement sheet to a portion of a respective one of the plurality M of flexible material sheets;
cutting each of the plurality of flexible material sheets to form a plurality N of sculptural pieces where N is greater than M and where N is at least 3;
cutting a top edge on each of the plurality of sculptural pieces to define a respective sculptural piece profile shape;
wherein the sculptural piece profile shape of one sculptural piece is different than the sculptural piece profile shape of at least two other sculptural pieces; wherein each sculptural piece profile shape of the at least two other sculptural pieces are different from each other; wherein each of the sculptural pieces has a top face and a bottom face opposite the top face;
arranging the sculptural pieces in a predetermined order to define at least a first sculptural piece, a second sculptural piece, and a third sculptural piece;
defining a first set of connection columns on the top face of the first sculptural piece, each of the connection columns of the first set of connection columns being elongated, each being offset from one another, and each being within 5 degrees of parallel to each other;
using an adhesive to fixedly connect the bottom face of the second sculptural piece to the top face of the first sculptural piece at the first set of connection columns;
defining a second set of connection columns on the top face of the second sculptural piece, each of the connection columns of the second set of connection columns being elongated, each being offset from one another, each being offset from each of the connection columns of the first set of connection columns, and each being within 5 degrees of parallel to each other; and
using the adhesive to fixedly connect the bottom face of the third sculptural piece to the top face of the second sculptural piece at the second set of connection columns.

* * * * *